Dec. 20, 1938.　　　　E. R. FITCH　　　　2,141,150
PISTON LUBRICATOR
Filed April 6, 1936
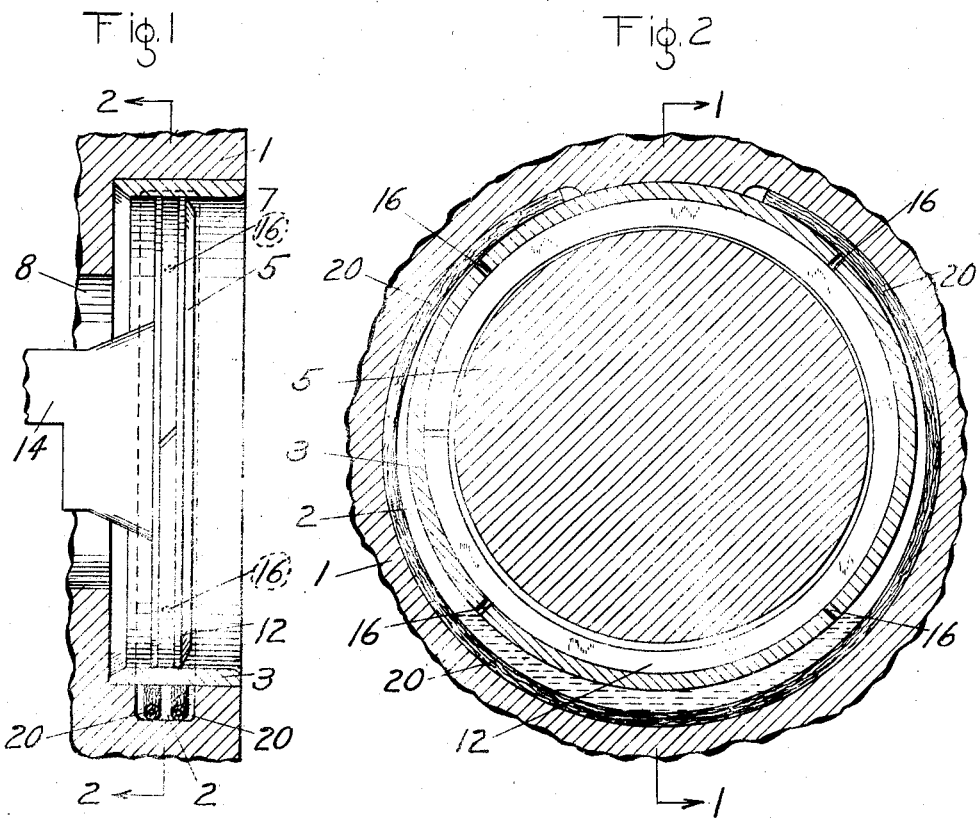
INVENTOR
ELLERY R FITCH
BY
*Wm. M. Cady*
ATTORNEY Patented Dec. 20, 1938

2,141,150

UNITED STATES PATENT OFFICE 2,141,150

PISTON LUBRICATOR

Ellery R. Fitch, Irwin, Pa., assignor to The Westinghouse Air Brake Company, Wilmerding, Pa., a corporation of Pennsylvania Application April 6, 1936, Serial No. 72,971

2 Claims. (Cl. 184—18)

This invention relates to a brake controlling valve device and particularly to a brake controlling valve device having means for supplying lubricant to portions of the valve device.

It is an object of this invention to provide an improved brake controlling valve device incorporating means for supplying lubricant to portions of the valve device at periodic intervals.

A further object of the invention is to provide an improved brake controlling valve device having associated therewith a chamber adapted to contain a quantity of lubricant and having means for supplying lubricant from this chamber to portions of the valve device to be lubricated.

Another object of the invention is to provide an improved brake controlling valve device incorporating means responsive to operation of the valve device for supplying lubricant to portions thereof.

A further object of the invention is to provide an improved brake controlling valve device.

Other objects of the invention and features of novelty will be apparent from the following description taken in connection with the accompanying drawing in which Fig. 1 is a fragmentary sectional view of a brake controlling valve device embodying this invention, this view being taken substantially along the line 1—1 of Fig. 2, and Fig. 2 is a sectional view taken substantially along the line 2—2 of Fig. 1.

Referring to the drawing, I have illustrated therein a portion of a brake controlling valve device incorporating this invention. The brake controlling valve device illustrated comprises a body 1, which may be constructed of any suitable material, such as cast iron, and is provided with a bore opening on a face thereof.

The body 1 of the valve device has, in addition, a channel or groove, indicated by the reference numeral 2, cut therein which extends throughout a portion only of the circumference of the bore in the body. As shown in the drawing, this channel extends around the bore in the body from a point at one side of the vertically uppermost point in the bore to a point at the other side of the vertically uppermost point in the bore.

The channel or groove 2 may be arranged in the body 1 eccentrically with respect to the bore in the body so that the portion of the channel or groove 2 adjacent the lower portions of the bore in the body is somewhat deeper than the portions of the channel or groove adjacent the upper portion of the bore in the body.

As is clearly shown in Fig. 1 of the drawing, the channel or groove 2 is disposed intermediate the ends of the bore in the body 1.

A bushing 3, which may be formed of any suitable material, such as brass or molded plastic composition, is mounted in the bore in the body 1. The bushing 3 comprises a tubular member of substantially the same length as the bore in the body 1, and is of such external diameter as to tightly fit the bore in the body 1.

The bushing 3 has a bore therein in which is mounted a piston 5, which is reciprocable in response to variations in the pressure of the fluid in a chamber 7 on one face thereof, and in a valve chamber 8 on the opposite face thereof. The piston 5 is reciprocable between a normal or release position, which is the position in which it is shown in Fig. 1 of the drawing, and an application position, in which a face of the piston engages a gasket secured against the face of the body 1.

The piston 5 has a groove cut in the periphery thereof and a packing ring 12 is mounted in this groove. The packing ring 12 may be constructed of any suitable material, such as brass, and is pressed outwardly by the inherent resiliency of the material of which it is constructed into firm engagement with the face of the bore in the bushing 3.

The piston 5 has a stem 14 formed integral therewith which operates valve mechanism, not shown, in the valve chamber 8.

The bushing 3 cooperates with the channel or groove 2 to form a chamber which is adapted to contain a quantity of lubricant, and the valve device provided by this invention incorporates means to transfer lubricant from this chamber to the portions of the valve device to be lubricated.

As is best shown in Fig. 2 of the drawing, a plurality of passages 16 extending through the bushing 3 are provided. These passages are spaced apart circumferentially of the bushing 3 and the lower ones of these passages communicate with the chamber formed by the channel or groove 2 at points vertically above the lowermost portions of this chamber, while the upper ones of these passages communicate with the upper portions of this chamber.

The passages 16 through the bushing 3 are arranged so as to communicate with ports in the face of the bore in the bushing 3 which are located substantially in alignment with the piston packing ring 12 when the piston 5 is in the normal or release position.

This valve device includes means for transferring lubricant by capillary attraction from the lower portions of the chamber formed by the groove or channel 2 to the upper portions thereof. This means comprises wicks 20 which may be of any suitable construction, such as wires twisted together and having bound therebetween fibrous material such as cotton or wool. The wicks 20 preferably extend throughout substantially the entire length of the channel or groove 2.

In the valve device shown in the drawing two wicks are employed and these only partially fill the channel or groove in the body 1, but it should be understood that a different number of wicks, or different kinds of wicks may be employed.

In operation, a quantity of suitable lubricant is supplied through the passages 16 in the bushing 3 to the chamber formed by the groove or channel 2 in the body 1. Sufficient lubricant is supplied to fill this chamber substantially to the level of the lower ones of the passages 16 through the bushing 3. Lubricant in excess of this amount supplied to this chamber is permitted to flow therefrom through the lower passages 16.

The piston 5 is thereafter inserted in the bushing 3, and when the valve device is placed in service fluid under pressure is supplied to the chambers 7 and 8 on the opposite faces of the piston 5.

Fluid under pressure supplied to the chambers 7 and 8 will flow past the periphery of the piston 5 and past the piston packing ring 12 to the passages 16 through the bushing 3 and thence to the chamber formed by the groove or channel 2 to increase the pressure of the fluid in this chamber.

Fluid under pressure supplied to the groove or channel 2 will come into contact with the wicks 20 which will be saturated with lubricant as a result of flow of lubricant throughout the length of these wicks by capillary attraction from the lubricant contained in the lower portions of the groove or channel 2.

On a reduction in the pressure of the fluid in the chamber 7 the piston 5 is moved to the right, as viewed in Fig. 1 of the drawing, from the release position to the application position. At the same time the valve mechanism operated by the stem 14 operates to release fluid under pressure at a restricted rate from the valve chamber 8. On this movement of the piston 5 the piston and packing ring 12 are moved out of alignment with the passages 16 through the bushing 3 and these passages are thereafter in open communication with the valve chamber 8. On the gradual reduction in the pressure of the fluid in the valve chamber 8 the fluid under pressure present in the upper portions of the chamber formed by the groove or channel 2 in the body 1 flows therefrom through the passages 16 to the valve chamber 8.

The fluid under pressure which flows from the groove or channel 2 will carry with it a small amount of lubricant which it has picked up as a result of its contact with the wicks 20, and as a result of the flow of the fluid over these wicks in passing from the chamber formed by the groove or channel 2 through the passages 16.

When the fluid which flows from the chamber formed by the channel or groove 2 through the passages 16 reaches the valve chamber 8, its velocity will be reduced and as a result, the lubricant which is carried by this fluid will be deposited on the face of the bore in the bushing 3 surrounding the passages 16. On a subsequent increase in the pressure of the fluid in the chamber 7 the piston 5 will be returned from the application position to the release position and the packing ring 12 will again be substantially in alignment with the passages 16 through the bushing 3. The piston 5 and the packing ring 12, therefore, will be in engagement with the face of the bore in the bushing 3 in the region in which the lubricant carried through the passages 16 is deposited. This lubricant, therefore, will reach the piston and packing ring and it will flow by capillary attraction around the piston and packing ring and on the next movement of the piston 5 in the bushing 3, the lubricant on the piston and packing ring will be distributed across the face of the bore in the bushing 3.

The amount of lubricant supplied from the groove or channel 2 to the face of the bore in the bushing 3 is regulated by the quantity of lubricant carried by the fluid which flows from the chamber formed by the channel or groove 2 to the valve chamber 8. As the volume of the chamber formed by the groove or channel 2 is relatively small the flow of fluid from the chamber is limited, and there is, therefore, no danger of over-lubrication of the valve device or of too rapid consumption of the lubricant contained in this chamber.

The quantity of lubricant in this chamber and rate of supply of lubricant therefrom are proportioned so that the lubricant in this chamber will supply the valve device for a time interval equal to the intervals at which the valve device is periodically removed from service for cleaning and inspection. The lubricant in the chamber may be replenished at the same time.

While one embodiment of the improved brake controlling valve device provided by this invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In an air brake valve device, in combination, a body having a bore therein, a bushing positioned in said bore, a piston mounted in said bushing, said piston having a normal position and being movable therefrom in response to variations in the pressure of the air in chambers at the faces thereof, said bushing and said body cooperating to form a lubricant chamber at least partially surrounding said bushing and being adapted to hold a quantity of liquid lubricant, said bushing being provided with a plurality of circumferentially spaced ports disposed substantially in the plane of said piston when said piston is in its normal position, said ports connecting said lubricant chamber with the interior of said bushing, certain of said ports being arranged to limit the level of lubricant when filling said chamber and the other of said ports being arranged to conduct lubricant to the interior of said bushing to facilitate movement of said piston in the normal position thereof.

2. In an air brake valve device, in combination, a body having a bore therein, a bushing positioned in said bore, a piston mounted in said bushing, said piston having a normal position and being movable therefrom in response to variations in the pressure of the air in chambers at the faces thereof, said bushing and said body cooperating to form a lubricant chamber at least partially surrounding said bushing and being adapted to hold a quantity of liquid lubricant, said bushing being provided with a plurality of circumferentially spaced ports disposed substantially in the plane of said piston when said piston is in its normal position, said ports connecting said lubricant chamber with the interior of said bushing, certain of said ports being arranged to limit the level of lubricant when filling said chamber and the other of said ports being arranged to conduct lubricant to the interior of said bushing to facilitate movement of said piston in the normal position thereof, and capillary means for conducting lubricant contained in said chamber to said other ports.

ELLERY R. FITCH.